(12) United States Patent
Mizoguchi et al.

(10) Patent No.: US 6,989,614 B2
(45) Date of Patent: Jan. 24, 2006

(54) OSCILLATING DEVICE

(75) Inventors: Yasushi Mizoguchi, Kanagawa (JP);
Masao Majima, Kanagawa (JP);
Yasuhiro Shimada, Kanagawa (JP);
Atsushi Kandori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 10/642,598

(22) Filed: Aug. 19, 2003

(65) Prior Publication Data

US 2004/0135644 A1 Jul. 15, 2004

(30) Foreign Application Priority Data

Aug. 21, 2002 (JP) .............................. 2002-239983
Aug. 21, 2002 (JP) .............................. 2002-239984

(51) Int. Cl.
*H02K 33/00* (2006.01)

(52) U.S. Cl. .......................... 310/36; 359/199; 359/224
(58) Field of Classification Search ................ 359/198, 359/199, 223, 224; 310/36, 40 R, 40 MM
See application file for complete search history.

(56) References Cited

U.S. PATENT DOCUMENTS

2003/0137711 A1 * 7/2003 Yagi et al.

FOREIGN PATENT DOCUMENTS

| JP | 6-82711 | 3/1994 |
| JP | 2001-305471 | 10/2001 |

* cited by examiner

*Primary Examiner*—James Phan
(74) *Attorney, Agent, or Firm*—Fitzpatrick, Cella, Harper & Scinto (57) ABSTRACT

To provide a small-size oscillating device, a coil is disposed on a substrate.

3 Claims, 11 Drawing Sheets

OSCILLATING DEVICE

BACKGROUND OF THE INVENTION

1. Field of the Invention

The present invention relates to an oscillating device having a movable plate capable of oscillating about a torsion center axis and a method of producing the same. Furthermore, this invention relates to an optical deflector, an optical scanner, an electrophotographic image-forming apparatus, and a projection-type image display apparatus, such as a display, which are provided with the oscillating device.

2. Related Background Art

Figure 14:
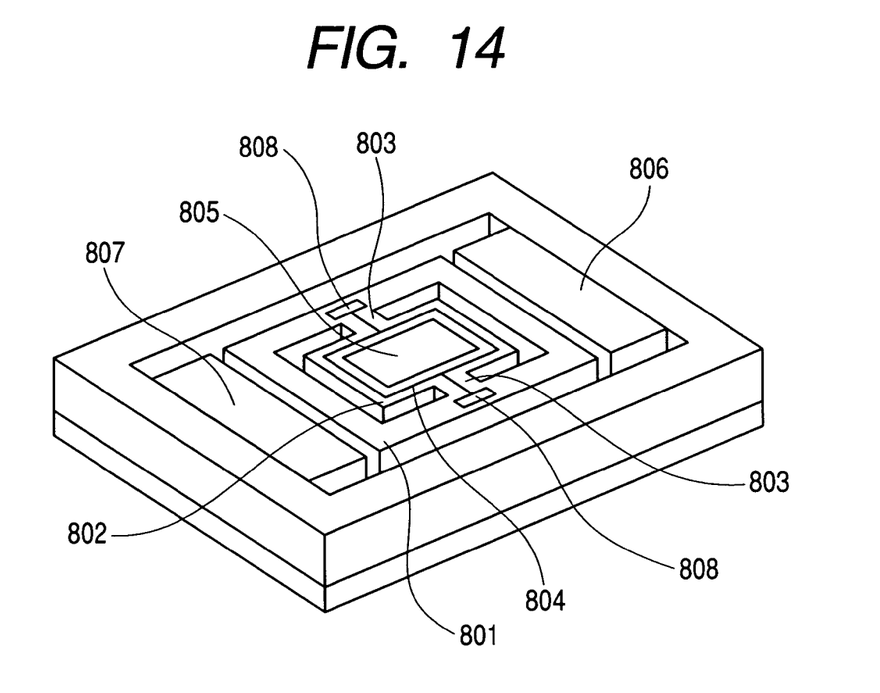
FIG. 14 is a view illustrating a resonant scanner of the prior art.

FIG. 14 is a perspective view of a resonant scanner described in Japanese Patent Application Laid-Open No. 2001-305471. Reference numeral 801 denotes a silicon substrate, reference numeral 802 denotes a movable part, reference numeral 803 denotes a torsion bar serving as an elastic supporting part, reference numeral 804 denotes a coil, reference numeral 805 denotes a total reflection mirror, reference numerals 806 and 807 denote permanent magnets, and reference numeral 808 denotes an electrode.

In this resonant scanner, the movable part 802 and the torsion bar 803 which supports the movable part 802 in such a manner that the movable part is capable of angular displacement with respect to the silicon substrate 801 are formed integrally with the silicon substrate 801, the coil 804 which allows application of a movable part driving current is provided on a periphery of the movable part 802, the total reflection mirror 805 is provided at the center of the movable part 802, and the permanent magnets 806 and 807 which apply a static magnetic field to opposing sections of the coil 804 on the movable part 802 which are parallel to the axial direction of the torsion bar 803 are disposed with the S pole of one and the N pole of the other facing to each other. This arrangement is also called a galvanometer mirror.

Figure 15:
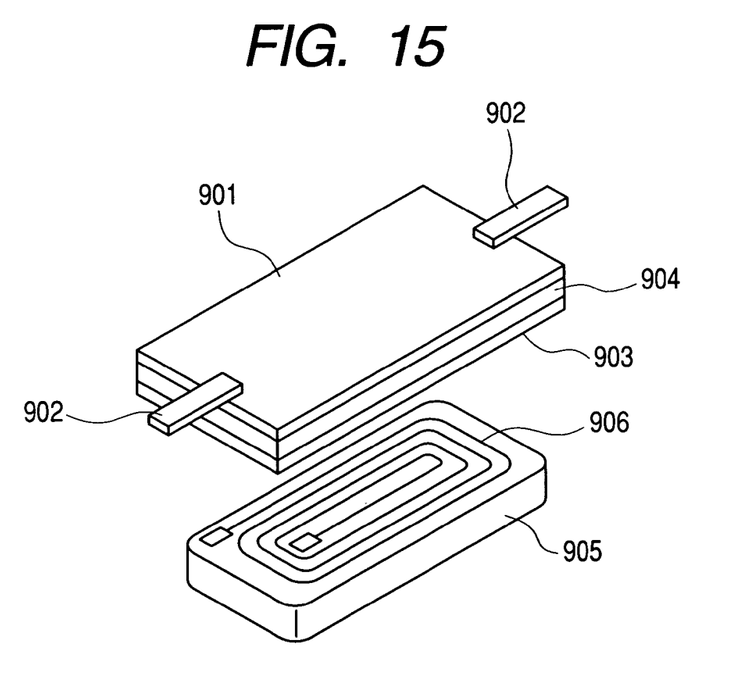
FIG. 15 is a view illustrating a scan mirror of the prior art.

FIG. 15 is a perspective view of a scan mirror described in Japanese Patent Application Laid-Open No. 6-82711. Reference numeral 901 denotes a mirror surface part, reference numeral 902 denotes a supporting member, reference numeral 903 denotes a permanent magnet, reference numeral 904 denotes a glass plate in the shape of a rectangular plate, reference numeral 905 denotes a semiconductor substrate and reference numeral 906 denotes a coil.

In this optical deflector, the mirror surface part 901 is provided on one surface of the movable plate 904, the permanent magnet 903 is magnetized to have opposite poles at the supporting members 902 on the opposite sides thereof and is provided on the other surface of the glass plate 904, and the coil 906, which is spiral and in the shape of a foil, is provided on the semiconductor substrate 905, such as of silicon, which is disposed to be in opposition to the permanent magnet 903.

The arrangement shown in FIG. 14 results in a large size, since the permanent magnets are disposed at the sides of the total reflection mirror.

The arrangement shown in FIG. 15 allows the glass plate to be oscillated only slightly, since the coil is disposed below the plate. In order to oscillate the glass plate largely, the gap between the coil and the glass plate needs to be increased, resulting in a large size arrangement. Furthermore, to oscillate the glass plate largely while maintaining the increased gap, a larger amount of current has to be supplied to the coil.

SUMMARY OF THE INVENTION

An object of the invention is to provide a small-sized oscillating device.

Thus, the invention provides an oscillating device comprising: a movable plate; an elastic supporting part connected to the movable plate; a substrate connected to the elastic supporting part; and a coil, wherein the coil is disposed on the substrate, and the movable plate oscillates about the elastic supporting part by the action of a magnetic field generated by the coil.

In addition, the invention provides a method of producing an oscillating device having a movable plate, an elastic supporting part connected to the movable plate, a substrate connected to the elastic supporting part and a coil, the method comprising a step of disposing the coil on the substrate, wherein the movable plate oscillates about the elastic supporting part by the action of a magnetic field generated by the coil.

DESCRIPTION OF THE PREFERRED EMBODIMENTS (First Embodiment)

The invention is characterized in that a coil intended for oscillating a movable plate is disposed on a substrate. As a result, a downsized oscillating device can be provided. In addition, in the case where a permanent magnet is provided on the movable plate, the coil is disposed close to the permanent magnet, and therefore, there is no need of applying an excessive amount of current to the coil. In addition, the angle of oscillation of the movable plate can be increased.

Figure 1A:
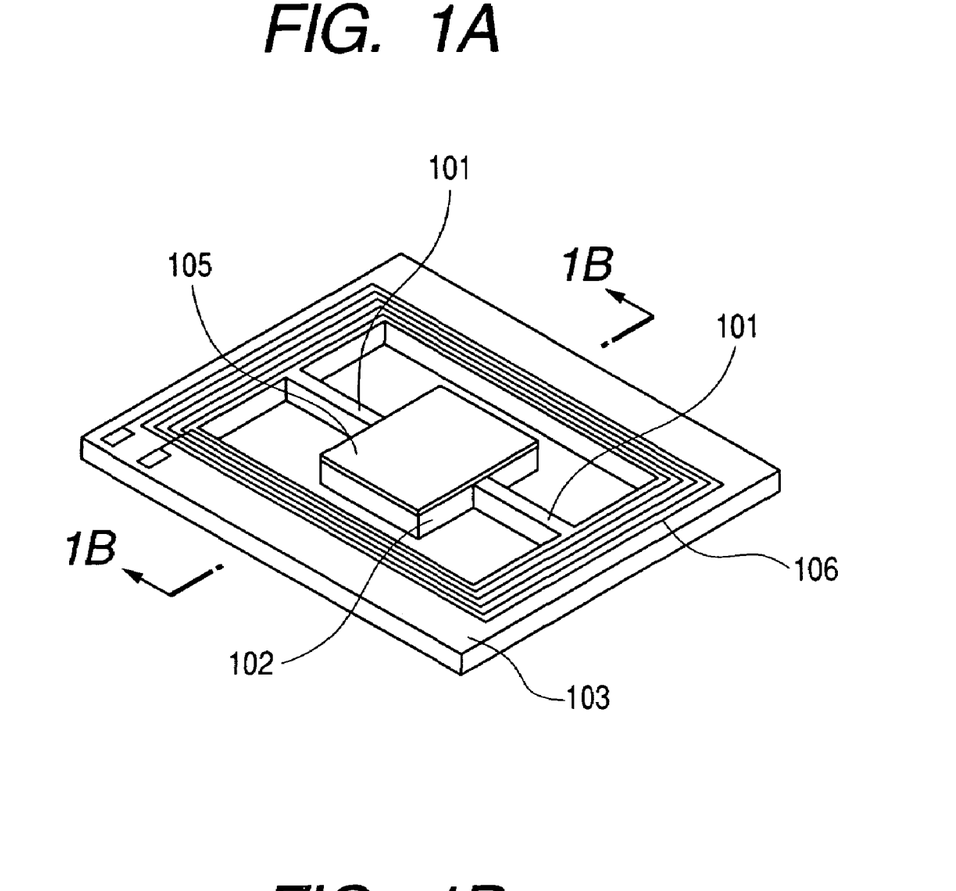
FIGS. 1A and 1B are views illustrating an oscillating device according to the invention.
Figure 1B:
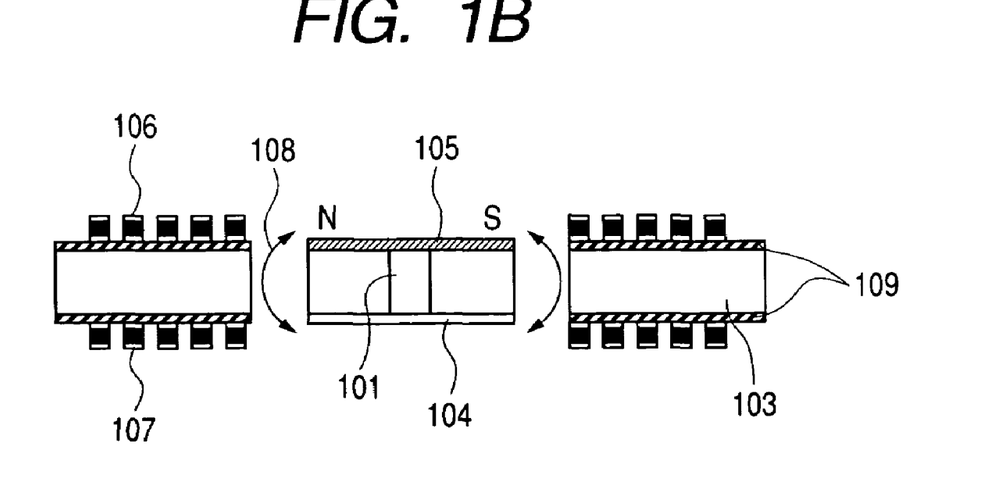

FIGS. 1A and 1B are schematic perspective views of an oscillating device according to a first embodiment of the invention. FIG. 1A is a schematic perspective view of the oscillating device viewed from the side on which a permanent magnet is provided. FIG. 1B is a schematic cross sectional view thereof taken along the line 1B—1B in FIG. 1A. Reference numeral 101 denotes a torsion bar serving as an elastic supporting part, reference numeral 102 denotes a scan mirror serving as a movable plate, reference numeral 103 denotes a substrate, reference numeral 106 denotes a planar coil located on the same side of the substrate as the permanent magnet, reference numeral 105 denotes a permanent magnet such as an alloy magnet, reference numeral 104 denotes a reflection mirror serving as a light-reflecting surface, reference numeral 107 denotes a planar coil located on the same side of the substrate as the reflection mirror, and reference numeral 109 denotes an insulating layer.

The torsion bars 101 are located so as to support the center of gravity of the scan mirror 102 from the both sides in a line with the scan mirror 102. The torsion bars 101 and the scan mirror 102 are formed integrally by shaping the substrate 103. The substrate 103 may be a semiconductor substrate, for example. In this embodiment, as the substrate 103, a single-crystal silicon substrate having a thickness of 200 $\mu$m is used. Vertically etching the single-crystal silicon substrate using an ICP-RIE apparatus (trade name: model 601E; manufactured by ALCATEL, for example) provides the scan mirror 102 and the torsion bar 101 formed integrally with the single-crystal silicon substrate 103.

On one side (surface) of the scan mirror 102, the reflection mirror 104 is formed by vaporization of aluminum or the like. The reflection mirror 104 can reflect an incident light. On the other side (surface) thereof, a rare earth permanent magnet such as of SmCo (samarium cobalt), a ferrite magnet, or an alloy magnet such as of FeCoCr or the like is formed in the shape of a thin film by sputtering. The permanent magnet 105 is magnetized in a direction crossing a torsion center axis of the torsion bar 101 at a given angle.

On the both surfaces of the substrate 103 inside of which the scan mirror 102 and the torsion bars 101 are formed, the two planar coils 106 and 107 surrounding the scan mirror 102 and the torsion bars 101 are provided with the respective insulating layers 109 being interposed therebetween. In this embodiment, the planar coils 106 and 107 are formed by electroplating. The insulating layers 109 are preferably provided to electrically separate the coil and the substrate from each other or to prevent a current leakage from the coil to the substrate in the case where the substrate is made of a conductive material or a semiconductor material such as single-crystal silicon.

When forming the planar coil 106 and 107 on the both surfaces of the substrate 103, the planar coils 106 and 107 may be electrically connected to each other to form a two-layer planar coil. In this case, it is preferred that the planar coils 106 and 107 spiral in opposite directions when viewed from one direction, the centers of the spirals coincide with each other, and an end of the planar coil 106 at the center of the spiral and an end of the planar coil 107 at the center of the spiral are electrically connected to each other by a conductor.

In this case, as in the case where driving of the scan mirror and detection of an induced voltage are attained by a single planar coil, driving signals have a period in which no current is applied to the planar coils, and during the period of applying no current, the induced voltage can be detected.

Alternatively, the planar coils 106 and 107 may be separately formed without being electrically connected to each other. In this case, one of the coils, the planar coil 106, for example, can be energized to produce a magnetic field, thereby angular-displacing (oscillating) the scan mirror 102 about the pair of torsion bars 101 as indicated by an arrow 108 in FIG. 1B. Then, since the permanent magnet 105 formed on one surface of the scan mirror 102 is also angular-displaced, the induced voltage occurring in the other planar coil 107 can be detected. In this case, the planar coil 107 is dedicated to detection of the induced voltage, and therefore, driving signals for the planar coil 106, which is dedicated to driving of the device, are not required to have a period of applying no current. Alternatively, both the planar coils 106 and 107 may be used for driving of the scan mirror, and one of them may be used also for detecting the induced voltage.

Figure 3:
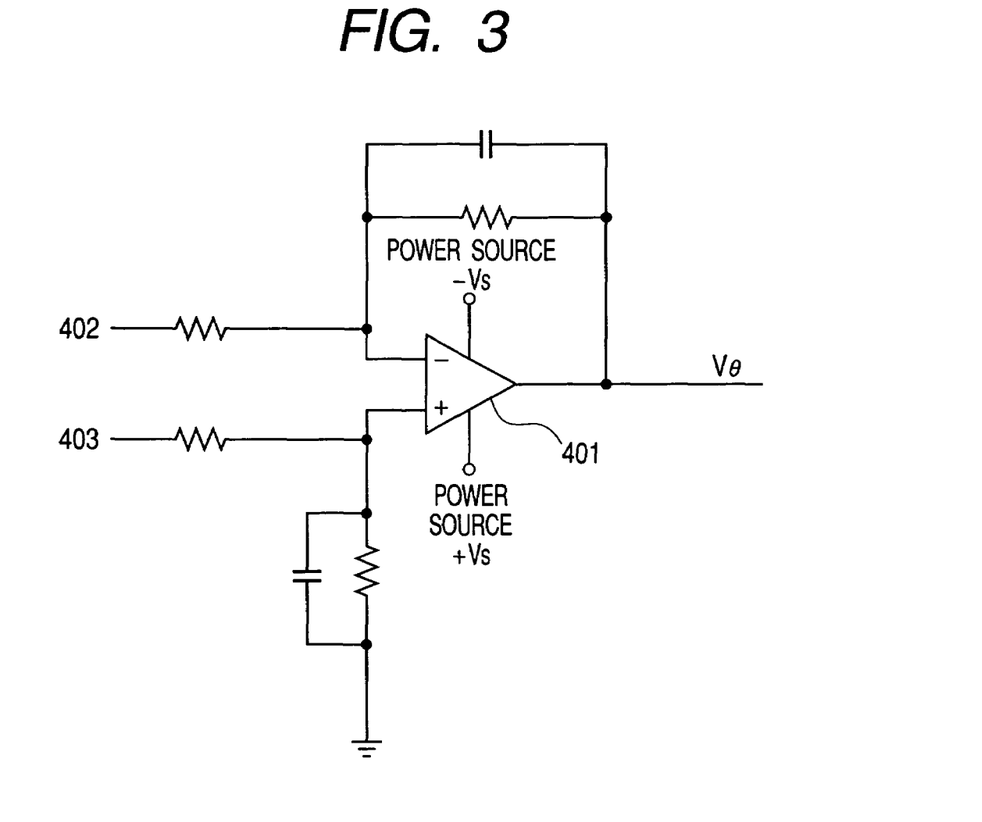
FIG. 3 is a diagram showing a specific arrangement of a circuit for detecting an induced voltage of the oscillating device according to the invention.

A detection circuit for the induced voltage is shown in FIG. 3, for example. The terminals of the planar coil is connected to input terminals 402 and 403 of a differential amplifier circuit composed of an operational amplifier 401, resistances and capacitors, and an induced voltage $V_\theta$ is detected. The induced voltage $V_\theta$ is responsive to the angular velocity of the scan mirror 102, and the displacement angle of the scan mirror 102 can be detected by inputting the induced voltage $V_\theta$ to an integrator. Therefore, the driving voltage of the planar coil is controlled based on the induced voltage $V_\theta$.

Each of the planar coils formed on the surfaces may be composed of a single layer or multiple layers. In addition, the permanent magnet 105 may be provided on the both surfaces of the scan mirror 102. This can result in improvement in the energy efficiency. In this case, one of the permanent magnets 105 may be processed to have a mirror surface, which can be used as the reflection mirror 104.

The optical deflector, which is the oscillating device according to this embodiment, can have a reduced size because the scan mirror 102, the torsion bars 101 and the planar coils 106 and 107 are formed on the same substrate 103.

Furthermore, since the permanent magnet 105 and the two planar coils 106 and 107 are disposed closer to each other with the permanent magnet 105 and one of the planar coils being substantially flush with each other, the magnetic field generated by energization of both or either of the planar coils acts on the permanent magnet efficiently, whereby large angular displacement of the scan mirror can be attained.

In addition, the induced voltage occurring in the planar coil when the scan mirror is angular-displaced (the planar coil may be one used only for detection or for both detection and driving) has a larger value than it has when the permanent magnet and the planar coil are largely distant from each other. Therefore, the induced voltage detected can be fed back to the driving system to control the displacement angle with high precision.

(Second Embodiment)

An oscillating device according to a second embodiment of the invention is the same as the device according to the first embodiment except that it further comprises an additional substrate having a recess or through hole, and the additional substrate and the substrate having the movable plate integrally formed therein are superposed on each other. This arrangement can realize downsizing and keep the movable plate from colliding with the additional substrate.

Figure 2:
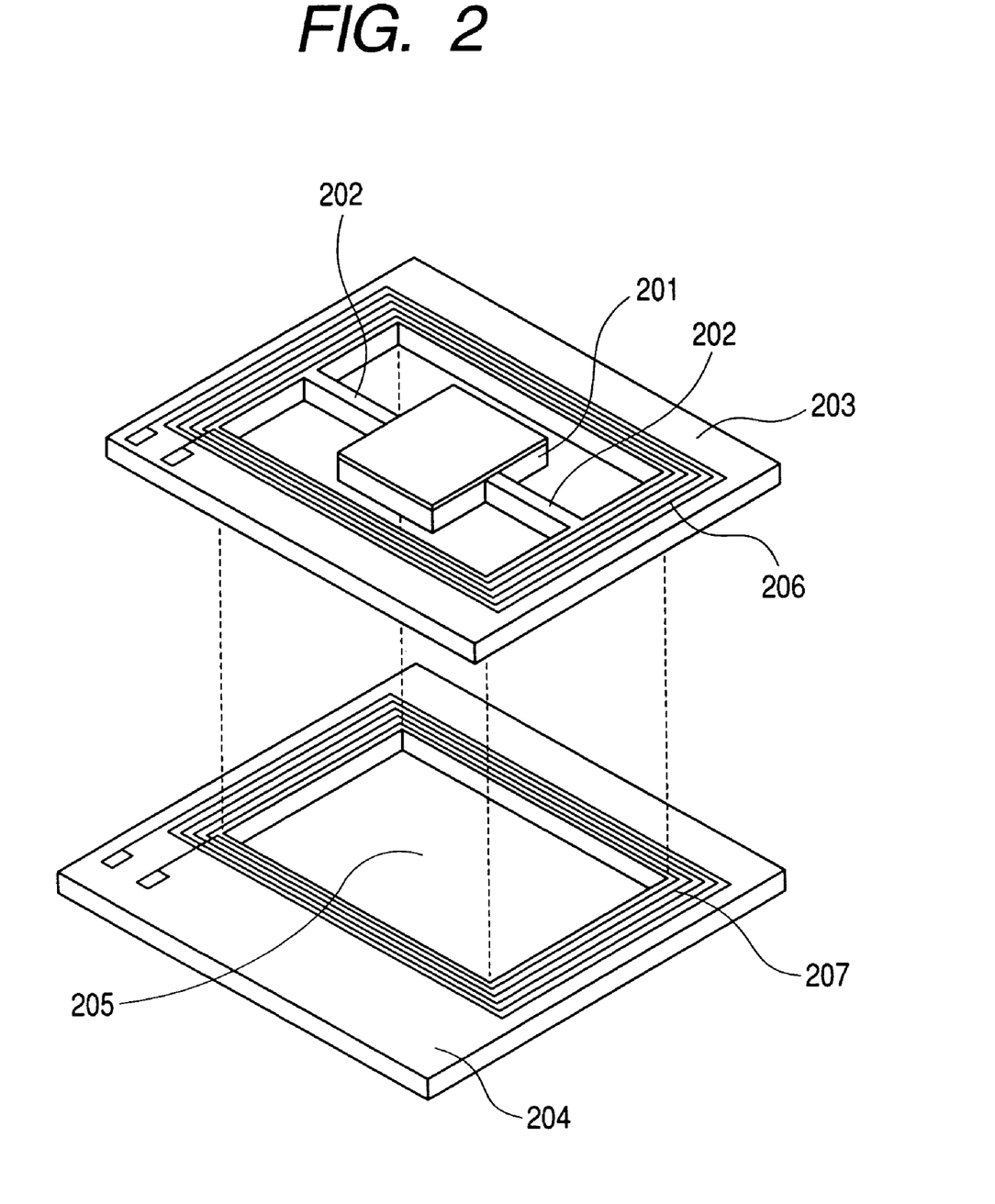
FIG. 2 is a view illustrating an oscillating device according to the invention.

FIG. 2 is a schematic exploded view showing an arrangement of an optical deflector, which is the oscillating device according to this embodiment.

Reference numeral 201 denotes a scan mirror serving as a movable plate, reference numeral 202 denotes a torsion bar serving as an elastic supporting part, reference numeral 203 denotes a substrate, reference numeral 204 denotes an additional substrate, reference numeral 205 denotes a recess or through hole provided in the additional substrate, and reference numerals 206 and 207 denote planar coils. The planar coils are provided on the substrate 203 and the additional substrate 204, respectively.

The planar coil 206 is provided on a surface of the substrate 203, which has the scan mirror 201 and the torsion bar 202 formed therein, with an insulating film (not shown) being interposed therebetween. The other planar coil 207 is provided on the additional substrate 204 with an insulating film (not shown) interposed therebetween.

The substrate 204 has the recess or through hole 205 formed therein, and the planar coil 207 is provided in a spiral shape on the periphery of the recess or through hole 205. The recess or through hole 205 may be of any size (lengths in the longitudinal and lateral directions in the plane or length in the depth direction) as far as the scan mirror 201 and the torsion bar 202 does not interfere with (collide with) the substrate 204 having the planar coil 207 formed thereon when the substrate 203 having the scan mirror 201 and the torsion bar 202 formed therein and the substrate 204 having the planar coil 207 formed thereon are disposed close to each other and an angular displacement of the scan mirror 201 occurs.

In the figure, the recess or through hole 205 has substantially the same size as the through hole formed in the substrate 203 as a result of the formation of the scan mirror 201 and the torsion bar 202.

If the substrate 204 is a single-crystal silicon substrate, the recess or through hole 205 can be formed by processing the substrate by anisotropic etching or the like.

Also in this embodiment, at least one planar coil can be energized to produce a magnetic field, thereby attaining an angular displacement of the scan mirror 201. Furthermore, an angular displacement of a permanent magnet formed on a surface of the scan mirror 201 allows the induced voltage occurring in the planar coil to be detected.

(Third Embodiment)

An oscillating device according to a third embodiment is the same as the device according to any of the first and second embodiment except that the substrate having the movable plate integrally formed therein is disposed between two opposing additional substrates, and each of the additional substrates has a coil disposed thereon. This arrangement can realize downsizing and avoid any coil from being provided on the substrate having the movable plate. Furthermore, the coils can be positioned at any locations in the planes beyond the region of the substrate having the movable plate.

Figure 4:
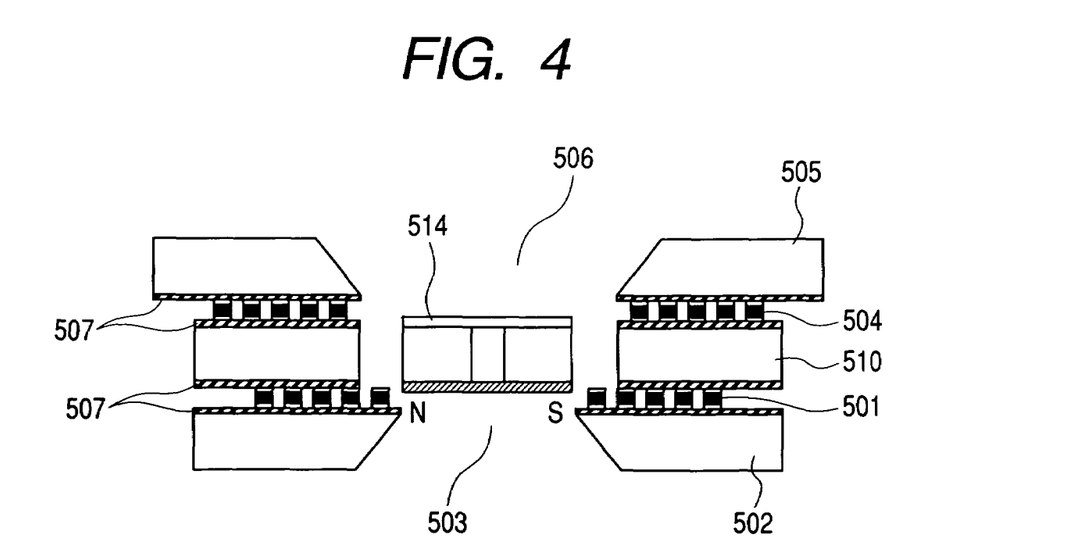
FIG. 4 is a view illustrating an oscillating device according to the invention.

FIG. 4 is a schematic cross sectional view of an optical deflector, which is the oscillating device according to this embodiment. The cross section is taken along a line similar to the line 1B-1B in FIG. 1A.

Reference numerals 501 and 504 denote planar coils, reference numerals 502 and 505 denote additional substrates, reference numerals 503 and 506 denote through holes, reference numeral 507 denotes an insulating film, reference numeral 514 denotes a reflection mirror serving as a light reflection surface, and reference numeral 510 denotes a substrate.

In this embodiment, the substrate 510 is a single-crystal silicon substrate.

The two planar coils 501 and 504 are formed by electroplating on the single-crystal silicon substrates 502 and 505 each having an insulating film 507, respectively, rather than on the substrate 510 having the scan mirror and the torsion bar formed therein. One of the coils can be disposed to be substantially flush with a permanent magnet.

At the centers of the planar coils 501 and 504, the through holes 503 and 506 are formed by crystal anisotropic etching, respectively. In assembly, an adhesive (not shown) is applied to the surfaces of the planar coils, and then the substrates with the planar coils are bonded to the substrate 510 (the substrate 510 also has insulating films 507 on the surfaces as shown in the figure). The adhesive serves also as an insulating layer. In this embodiment, the planar coil 504 is wholly mounted on the single-crystal silicon substrate 510 having the scan mirror and the torsion bar formed therein, while the planar coil 501 disposed on the other additional substrate partially faces the through hole of the substrate 510.

In this arrangement in which the planar coils 510 and 504 are disposed one on the other, the through hole 506 of the substrate 505 with the planar coil 504 located on the same side of the substrate 501 as the reflection mirror 514 has such dimensions that prevent the incident light and the light scanned by the scan mirror from being blocked. Specifically, the through hole 506 of the additional substrate 505 has a smaller opening at the surface of the substrate close to the reflection mirror and a larger opening at the surface far from the reflection mirror. For example, it preferably has a tapered shape as shown in the figure.

The opening of the additional substrate 502 at the surface close to the movable plate can be of any size as far as the substrate does not collide with the movable plate. Furthermore, the additional substrate 502 may have a recess that does not penetrate the substrate, rather than the through hole.

(Fourth Embodiment)

An oscillating device according to a fourth embodiment is characterized in that the coil is disposed in such a manner that at least a part thereof intersects with the elastic supporting part. As a result, a downsized device can be provided. Except that, the oscillating device is the same as that according to any of the first to third embodiments.

Figure 5A:
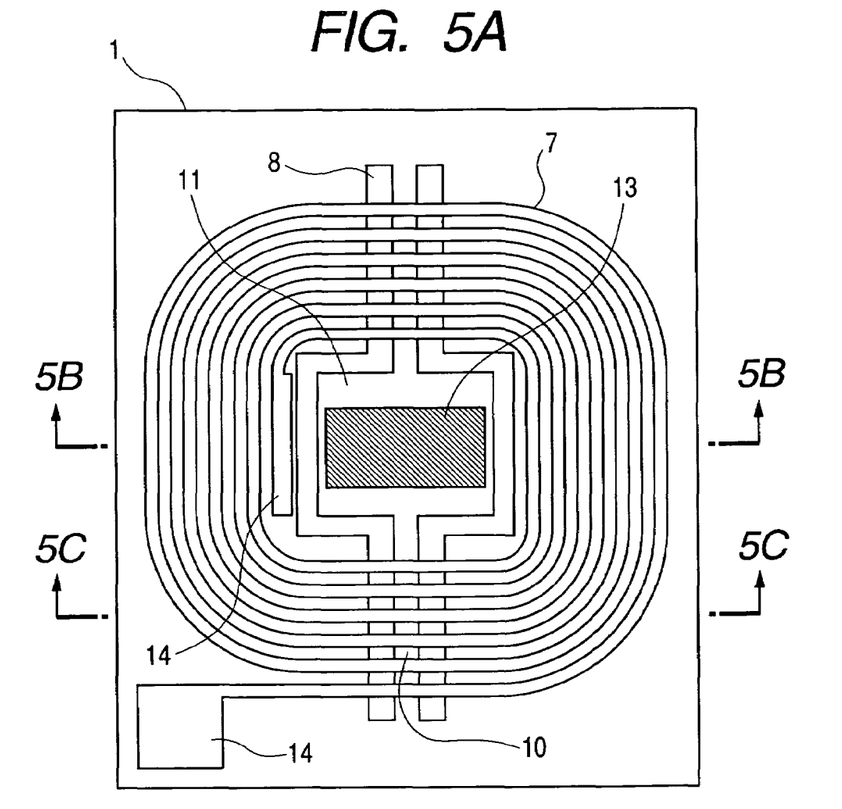
FIGS. 5A, 5B and 5C are views illustrating an oscillating device according to the invention.
Figure 5B:
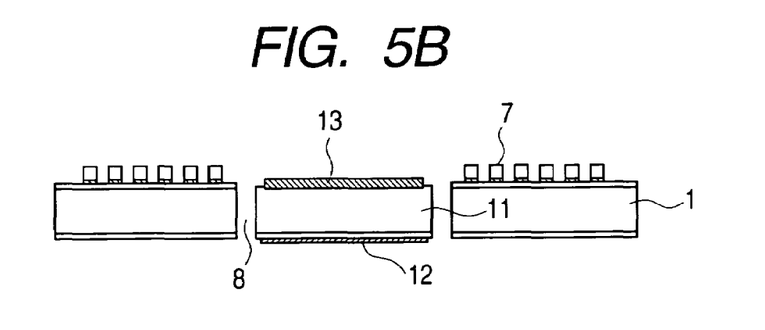
Figure 5C:
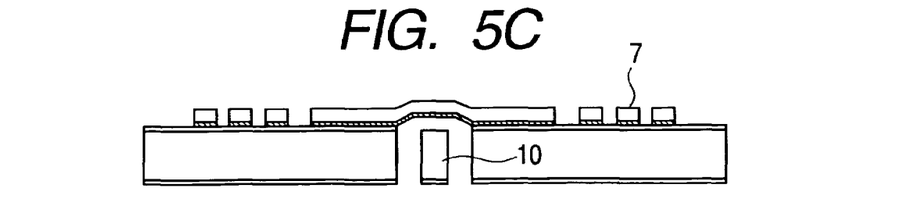

FIGS. 5A to 5C are schematic views of an optical deflector, which is the oscillating device according to this embodiment. FIG. 5A is a top view of the oscillating device, FIG. 5B is a cross sectional view taken along the line 5B—5B, and FIG. 5C is a cross sectional view taken along the line 5C—5C.

Reference numeral 1 denotes a substrate, reference numeral 7 denotes a coil, reference numeral 8 denotes a through hole, reference numeral 10 denotes an elastic supporting part, reference numeral 11 denotes a movable plate, reference numeral 12 denotes a mirror serving as a light reflection surface, reference numeral 13 denotes a permanent magnet, and reference numeral 14 denotes an electrode pad.

As shown in FIG. 5A, the coil is disposed to intersect with the elastic supporting part over the through hole. This arrangement allows the coil to be disposed close to the movable plate. If the permanent magnet is disposed on the movable plate, the movable plate can be angular-displaced (oscillated) effectively.

The coil is provided on the substrate in a spiral shape. The electrode pad 14 is provided at each of the ends of the spiral.

As shown in FIG. 5B, the mirror 12 is disposed on the surface of the movable plate 11 that is opposite to the surface on which the permanent magnet 13 is disposed. The coil 7 is disposed on the surface of the substrate that is on the same side as the permanent magnet 13. In the figure, an insulating member (assigned no reference numeral) covering the whole substrate surface is provided between the substrate and the coil. In addition, a thick line shown directly under the coil 7 indicates a seed electrode layer described later.

As shown in FIG. 5C, the coil 7 is disposed to intersect with the elastic supporting part 10 over the through hole. In this drawing, a step (space) is provided between the coil 7 and the elastic supporting part 10. Thus, they are kept from contact with each other. The step (space) is shaped to be slightly higher than the level of the substrate.

In this embodiment, the movable plate 11 has dimensions of 1.2 mm by 1.5 mm. On the other hand, the elastic supporting part has a length (longer dimension, that is, dimension in the longitudinal direction) of 2 mm, and the coil 7 has a wire width of 30 $\mu$m and a height of 50 $\mu$m. These dimensions are substantially the same for the other embodiments.

In this embodiment, applying a voltage signal to both the electrode pads 14 produces a magnetic field at the inner periphery of the coil, and the magnetic field interacts with the permanent magnet 13 to cause the movable plate 11 to oscillate about the elastic supporting part 10. The electrode pad can be used in the oscillating device according to any of the embodiments described above.

In particular, if an alternating voltage signal having a frequency coinciding with the resonance frequency of the torsional oscillation of the movable plate 11 is applied to the coil 7, the movable plate 11 moves in a torsional resonance manner, and thus, there can be provided a larger displacement angle or deflection angle of the movable plate 11. This can be applied to the oscillating device according to any of the embodiments described above.

Now, methods of producing the oscillating device, specifically, the optical deflector having a mirror serving as a light reflection surface will be described.

FIGS. 6A to 6G, 7A to 7G and FIG. 8 are schematic diagrams for illustrating the methods of producing the oscillating device according to the invention.

FIGS. 6A to 6G are diagrams for illustrating the production method with reference to the cross sectional view taken along the line 5B—5B in FIG. 5A, and FIGS. 7A to 7G are diagrams for illustrating the production method with reference to the cross sectional view taken along the line 5C—5C in FIG. 5B.

Figure 6A:
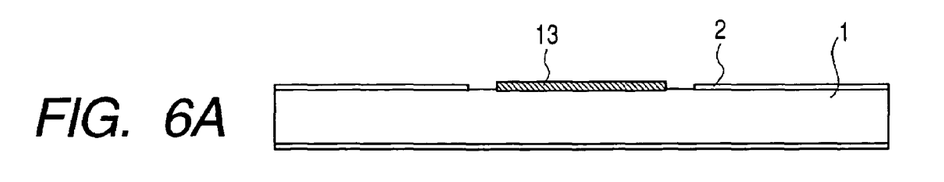
FIGS. 6A, 6B, 6C, 6D, 6E, 6F and 6G are cross sectional views illustrating production steps of an oscillating device according to the invention.
Figure 7A:
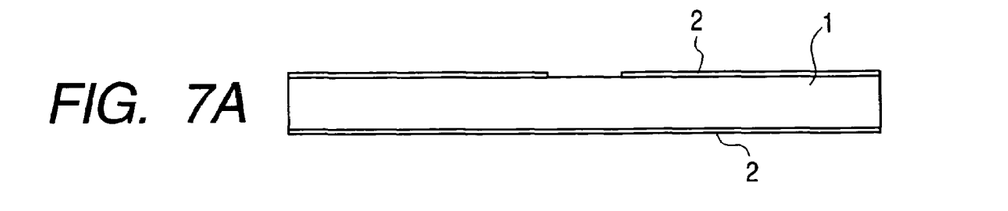
FIGS. 7A, 7B, 7C, 7D, 7E, 7F and 7G are cross sectional views illustrating production steps of an oscillating device according to the invention.

Reference numeral 3 denotes a sacrificial layer, reference numeral 4 denotes a seed electrode, reference numeral 5 denotes a mold layer, and reference numeral 6 denotes a coil layer.

In this embodiment, the substrate is a silicon substrate, and photolithography and etching techniques are used to fabricate the oscillating device.

First, as shown in FIGS. 6A and 7A, an insulating layer 2 is formed in a thickness of 1 $\mu$m on each surface of the silicon substrate 1 by thermal oxidation, the insulating layer 2 on the front surface is patterned by photolithography and etching (the insulating layer 2 is formed on the substrate 1 at a region except regions intended for the movable plate 11 and the elastic supporting part 10), and then, on the exposed surface of the substrate 1, a permanent magnet 13 containing iron, cobalt and chromium and having a thickness of 10 $\mu$m is formed by sputtering at the region intended for the movable plate 11.

Figure 6B:
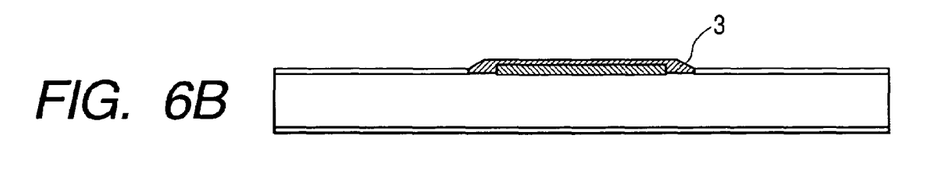
Figure 6C:
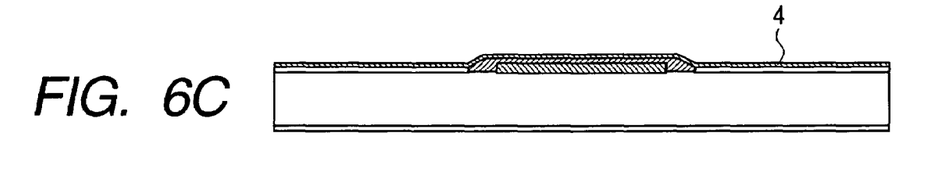
Figure 7B:
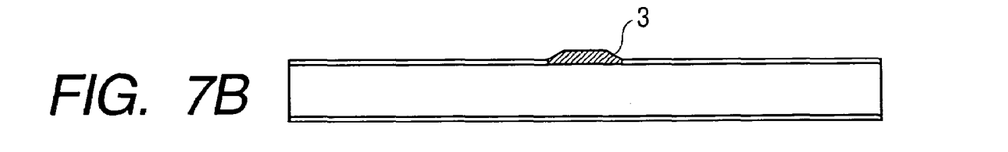
Figure 7C:
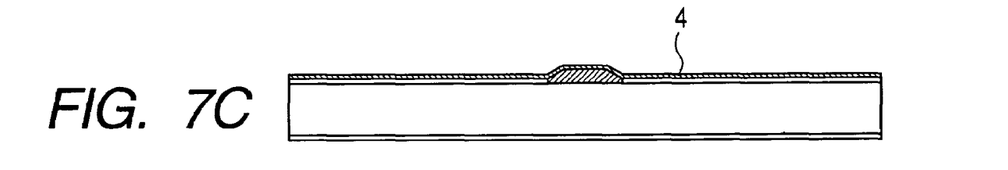

Then, as shown in FIGS. 6B and 7B, a photosensitive polyimide resin is applied to form the sacrificial layer 3 of a thickness of 3 $\mu$m, and then the sacrificial layer 3 is patterned by photolithography (the sacrificial layer 3 remains on the substrate 1 at the regions intended for the movable plate 11 and the elastic supporting part 10). Then, titanium and gold are deposited on the surface of the substrate 1 by vacuum evaporation to thicknesses of 5 nm and 100 nm, respectively, to form the seed electrode layer 4.

Figure 6D:
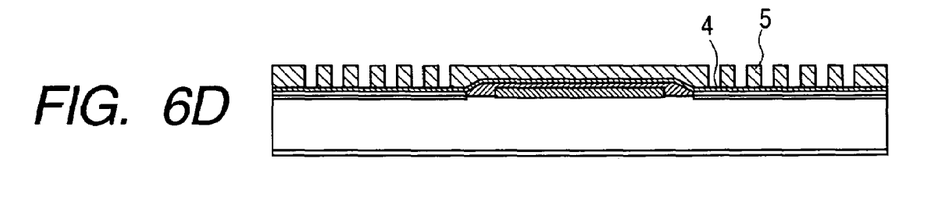
Figure 6E:
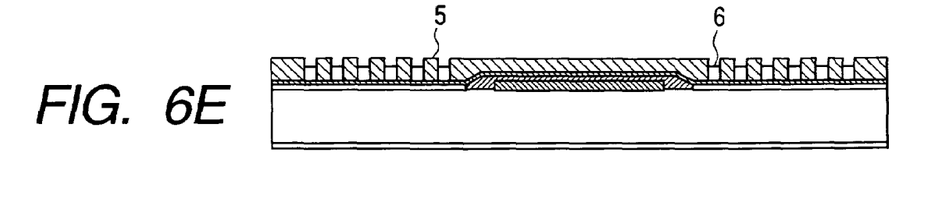
Figure 7D:
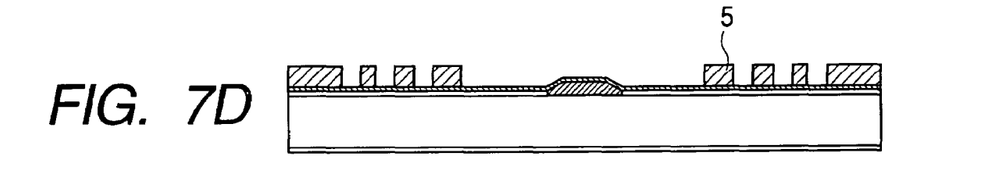
Figure 7E:
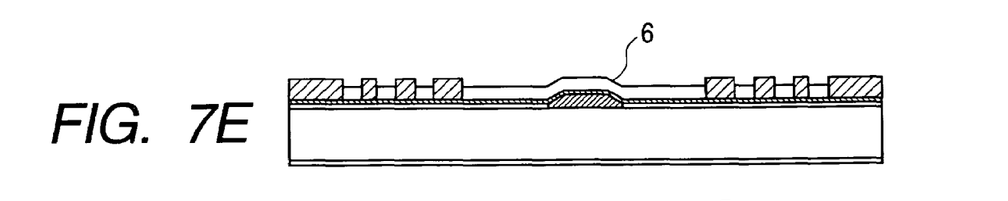

Then, as shown in FIGS. 6D and 7D, a photosensitive acrylic resin is applied in a thickness of 70 $\mu$m, and the resulting acrylic resin layer is patterned by photolithography to form the mold layer 5 for forming a coil. Then, as shown in FIGS. 6E and 7E, the substrate 1 is immersed in a plating solution, and a voltage is applied between the seed electrode 4 and an anode electrode, whereby the gaps in the mold layer 5 which expose the seed electrode layer 4 are filled with copper by electroplating to form the coil layer 6 having a thickness of 50 $\mu$m.

Figure 6F:
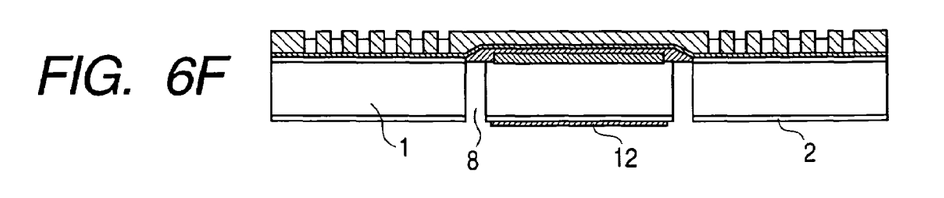
Figure 7F:
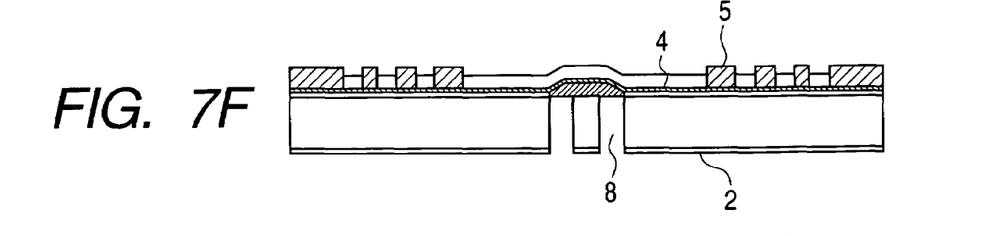

Then, aluminum is deposited on the back surface of the substrate 1 in a thickness of 200 nm by sputtering, and the resulting aluminum film is patterned by lithography and etching to form the mirror 12 on the substrate 1 at the region intended for the movable plate 11. Then, as shown in FIGS. 6F and 7F, the insulating layer 2 on the back surface of the substrate 1 is patterned by photolithography and etching (the insulating layer 2 is removed at the region intended for the through hole 8), and then, using a high density plasma, the substrate 1 is dry-etched from the back surface until the sacrificial layer 3 is exposed.

Figure 6G:
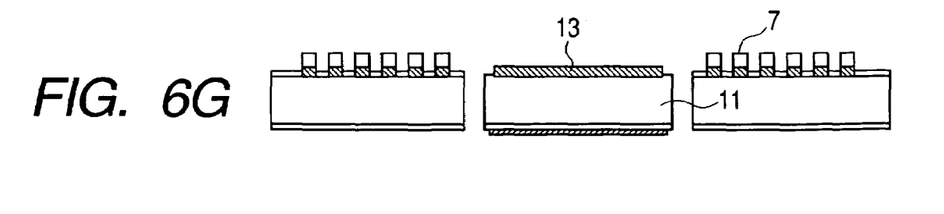
Figure 7G:
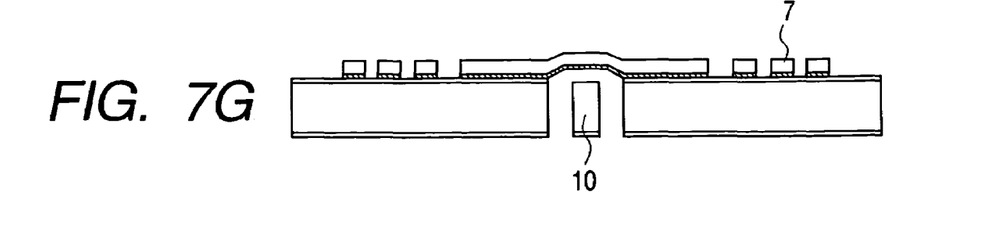

Finally, as shown in FIGS. 6G and 7G, the sacrificial layer 3 and the mold layer 5 are removed by ashing using an oxide plasma, and then, the seed electrode layer 4 is removed except for the region under the coil 7 by dry etching using argon gas. Thus, the through hole 8, the coil 7, the elastic supporting part 10 and the movable plate 11 are formed.

According to the production method according to this embodiment, a plurality of optical deflectors can be simultaneously formed on one substrate in a batch process. Thus, the step of assembling the substrate having the movable plate and the coil into one device can be omitted, and thus, a cost reduction can be attained. In addition, according to this embodiment, there can be provided an optical deflector that is small in size and low in power consumption and production cost and generates a high power.

Figure 8:
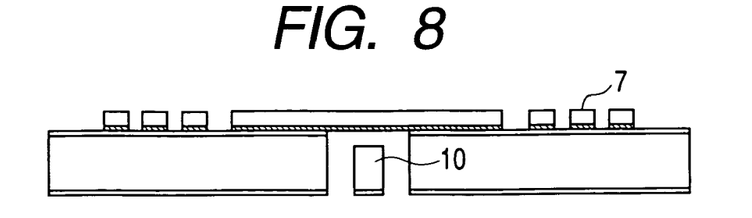
FIG. 8 is a view illustrating an oscillating device according to the invention.

In this embodiment, the space between the coil 7 and the elastic supporting part 10 is provided by shaping the section of the coil 7 intersecting with the elastic supporting part 10 to be slightly higher than the level of the substrate 1. However, as shown in FIG. 8, the coil 7 may be formed entirely at the same level as the substrate 1, and the upper surface of the elastic supporting part 10 may be slightly trimmed down below the level of the substrate 1 to provide a space between the coil 7 and the elastic supporting part 10. In this case, before forming the sacrificial layer 3 as shown in FIG. 7B, the part of the substrate 1 intended for the elastic supporting part 10 is slightly trimmed down by etching, and then, the sacrificial layer 3 is formed thereon to the level of the substrate 1.

(Fifth Embodiment)

An oscillating device according to a fifth embodiment of the invention is characterized in that the elastic supporting part has an X-shaped cross section. As a result, an oscillating device less susceptible to torsion and deflection can be provided. In addition, it is characterized in that the coils are disposed on both the surfaces of the substrate. As a result, an oscillating device that is lower in power consumption than that of the fourth embodiment can be provided. Except that, the oscillating device is the same as that according to the fourth embodiment.

Figure 9A:
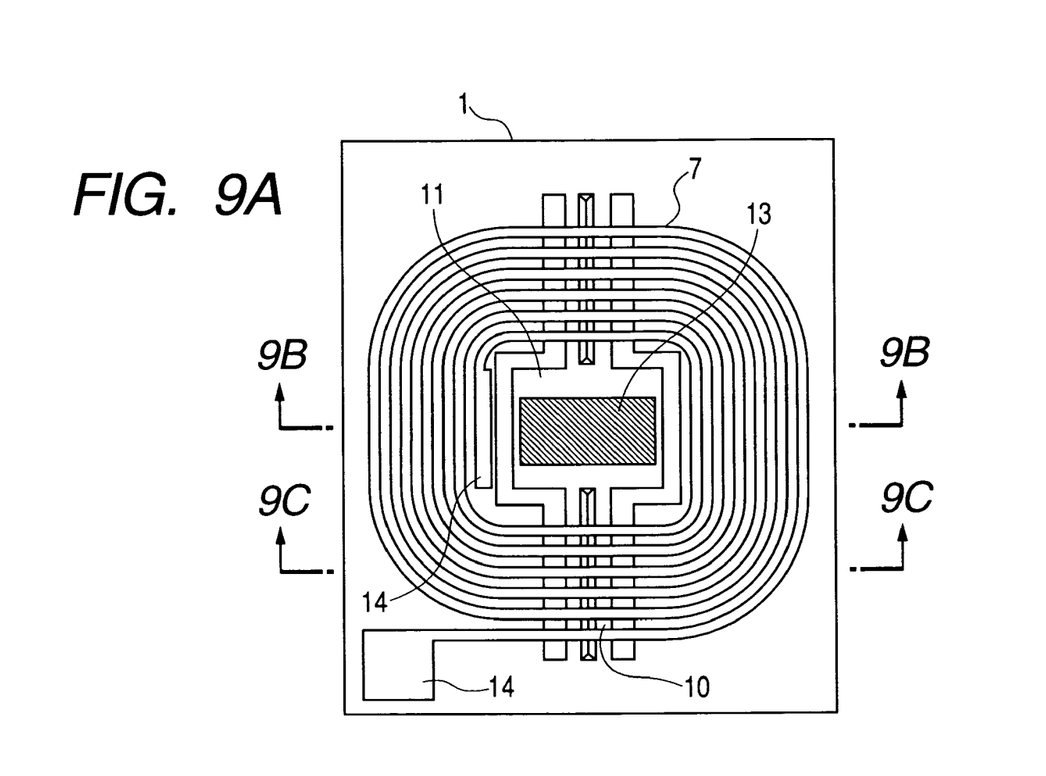
FIGS. 9A, 9B and 9C are views illustrating an oscillating device according to the invention.
Figure 9B:
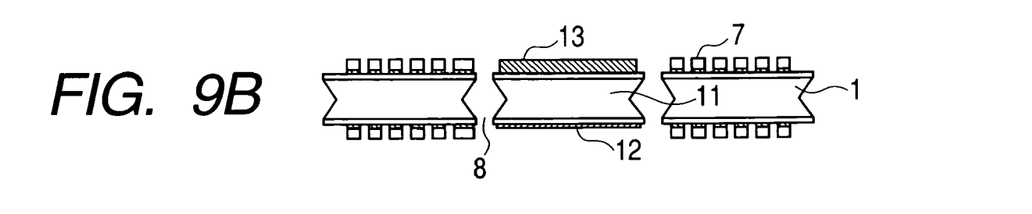
Figure 9C:
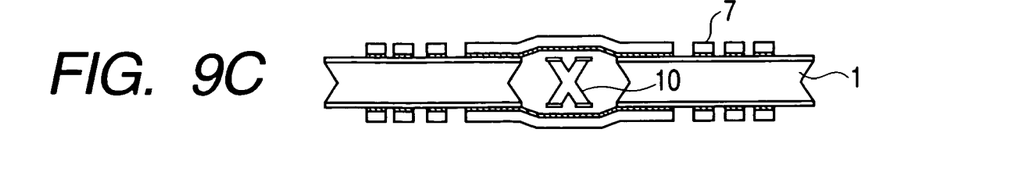

FIGS. 9A to 9C are schematic views of an optical deflector, which is the oscillating device according to this embodiment. FIG. 9A is a top view of the oscillating device, FIG. 9B is a cross sectional view taken along the line 9B—9B and FIG. 9C is a cross sectional view taken along the line 9C—9C. As can be seen from FIG. 9C, the elastic supporting part 10 has an X-shaped cross section. As a result, the oscillating device is less susceptible to torsion and deflection during oscillation.

Now, a method of producing the oscillating device, specifically, the optical deflector having a mirror serving as a light reflection surface will be described.

FIGS. 10A to 10G and 11A to 11G are schematic views for illustrating the production steps of the oscillating device according to the invention.

FIGS. 10A to 10G are views for illustrating the production steps with reference to the cross sectional view taken along the line 9B—9B in FIG. 9A, and FIGS. 11A to 11G are views for illustrating the production steps with reference to the cross sectional view taken along the line 9C—9C in FIG. 9A.

In this embodiment, the substrate is a silicon substrate, and photolithography and etching techniques are used to fabricate the oscillating device.

Figure 10A:
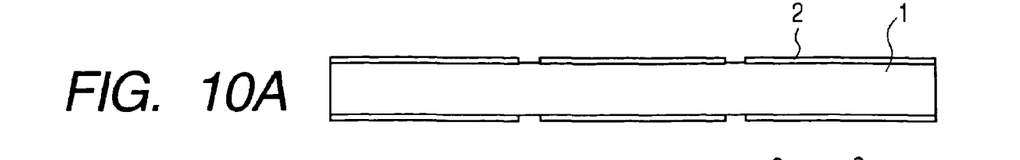
FIGS. 10A, 10B, 10C, 10D, 10E, 10F and 10G are cross sectional views illustrating production steps of an oscillating device according to the invention.
Figure 11A:
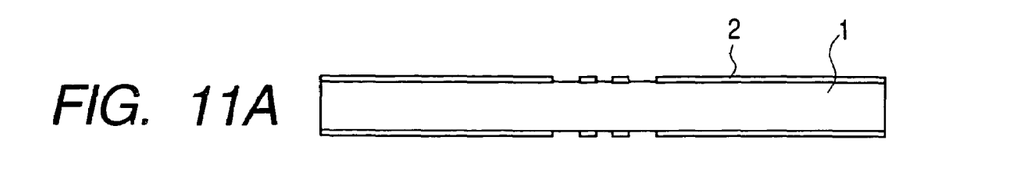
FIGS. 11A, 11B, 11C, 11D, 11E, 11F and 11G are cross sectional views illustrating production steps of an oscillating device according to the invention.

First, an insulating layer 2 having a thickness of 1 $\mu$m is formed on each surface of a silicon substrate 1, the silicon substrate having a thickness of 200 $\mu$m and having a major surface in the (100) plane, and then, the insulating layers 2 on the both surfaces are patterned by photolithography and etching (see FIGS. 10A and 11A).

Figure 11B:
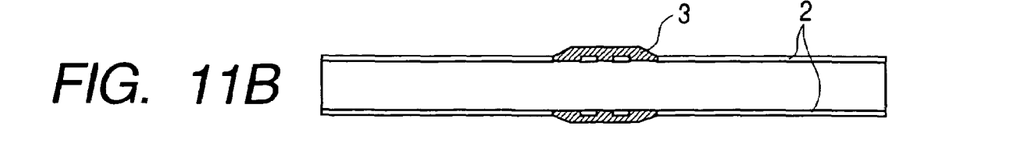
Figure 11C:
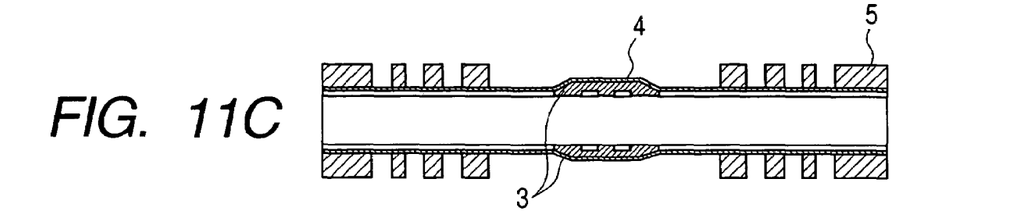

Then, polysilicon is deposited in a thickness of 3 $\mu$m on the both surfaces of the substrate 1 by the low pressure chemical vapor deposition, and the resulting polysilicon film is patterned by photolithography to form a sacrificial layer 3 (see FIGS. 11B and 11B). Then, titanium and gold are deposited by vacuum evaporation on the both surfaces of the substrate 1 to thicknesses of 5 nm and 100 nm, respectively, to form a seed electrode layer 4. Then, a photosensitive, chemical-amplification epoxy resin is applied on the both surfaces of the substrate 1 in a thickness of 70 $\mu$m, and the resulting epoxy resin layer is patterned by photolithography to form a mold layer 5 (see FIGS. 10C and 11C).

Figure 10B:
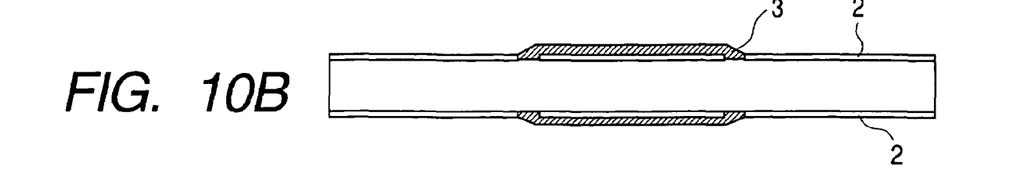
Figure 10C:
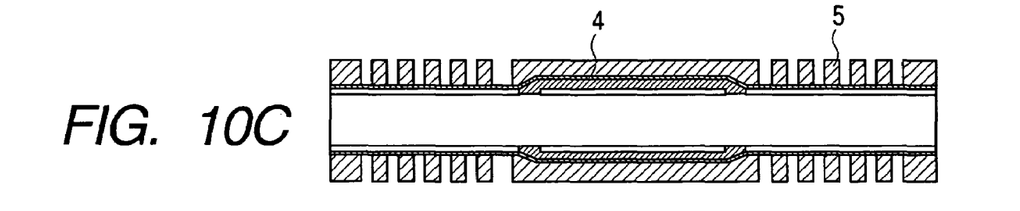
Figure 10D:
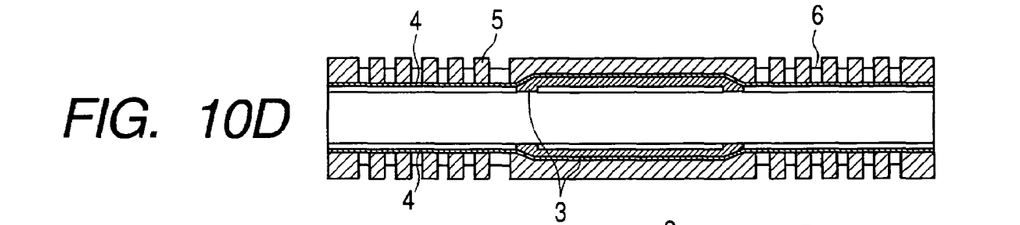
Figure 10E:
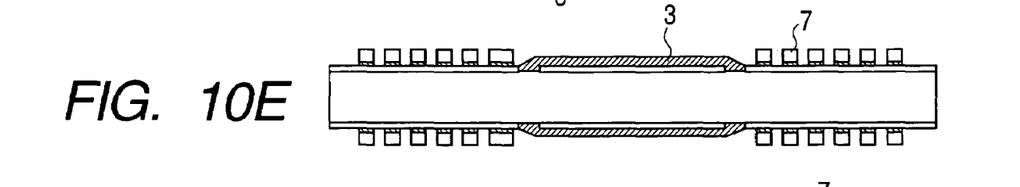
Figure 11D:
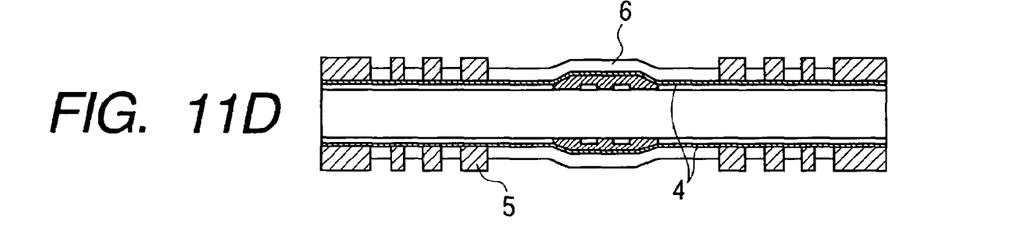
Figure 11E:
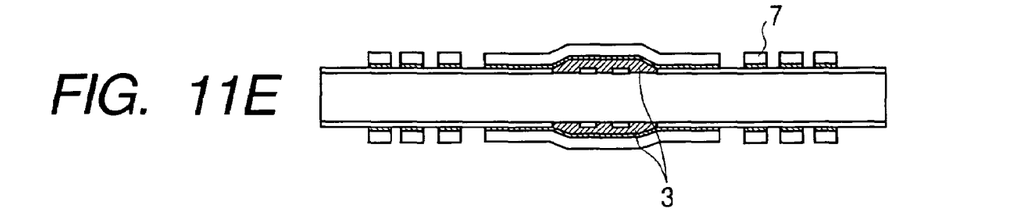

Then, the substrate 1 is immersed in a plating solution, and a voltage is applied between the seed electrode 4 and an anode electrode, whereby the gaps in the mold layer 5 are filled with copper by electroplating to form a coil layer 6 having a thickness of 50 $\mu$m (see FIGS. 10D and 11D). Then, after the mold layer 5 is removed using N-methyl-2-pyrrolidone, the seed electrode layer 4 is removed except the region under the coil 7 by dry etching using argon gas to provide the coil 7 (see FIGS. 10E and 11E).

Figure 10F:
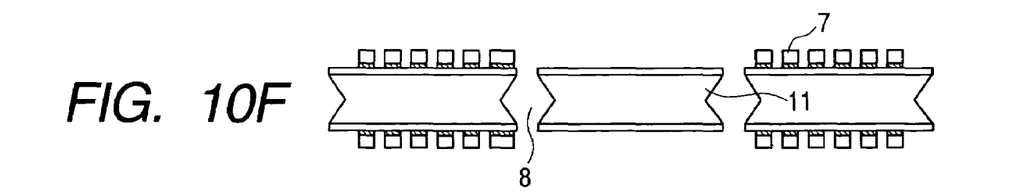
Figure 11F:
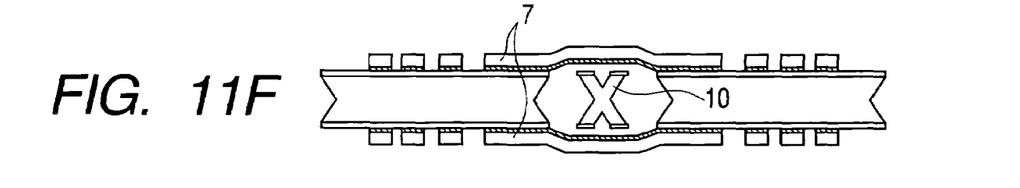

Then, the sacrificial layer 3 is removed using an aqueous potassium hydroxide solution heated to 100° C., and then the substrate 1 is etched using the aqueous potassium hydroxide solution heated to 100° C., thereby providing a through hole 8, the elastic supporting part 10 and a movable plate 11 (see FIGS. 10F and 11F). The aqueous potassium hydroxide solution has a high etch anisotropy to single-crystal silicon, and the etching stops at planes equivalent to (111) plane. Therefore, if the processing is conducted in such a manner that the longitudinal direction of the elastic supporting part 10 is parallel to planes equivalent to (110) plane, the elastic supporting part 10 has an X-shaped cross section as shown in FIG. 11F.

Then, aluminum is deposited on the back surface of the movable part 11 in a thickness of 200 nm by vacuum evaporation using a metal mask to form a mirror 12. Finally, a permanent magnet 13 is bonded to the front surface of the movable part 11 (see FIGS. 10G and 11G).

Figure 10G:
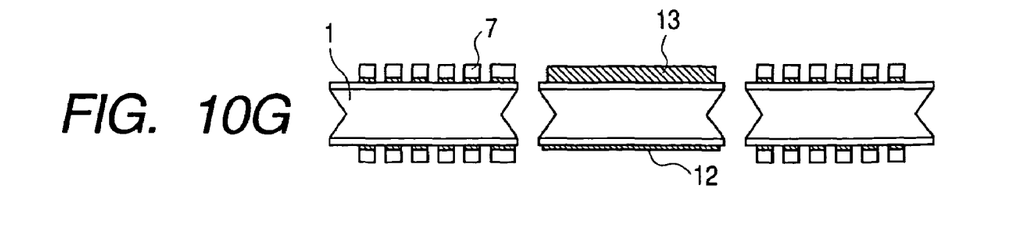
Figure 11G:
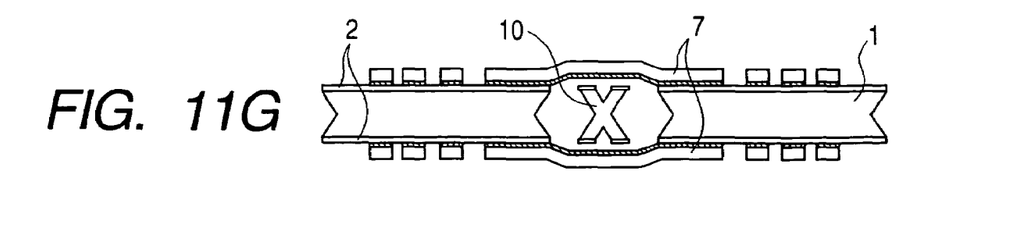

While the coils 7 on the both surfaces of the substrate 1 are electrically separated from each other in this embodiment, they may be connected to each other at their inner ends so as to serve as a single coil, for example. In this case, if it is provided that the two spirals viewed from the front surface side of the substrate 1 are directed oppositely, the part of the coil on the front surface and the part of the coil on the back surface can produce magnetic fields in the same direction.

(Sixth Embodiment)

A sixth embodiment of the invention relates to a projection-type image display apparatus having the oscillating device according to any of the first to fifth embodiments.

Figure 12:
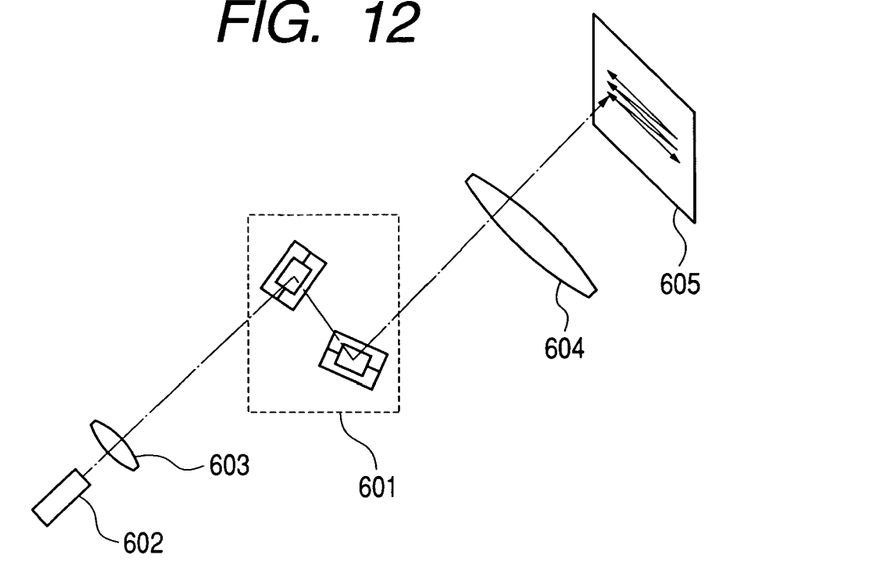
FIG. 12 is a view illustrating an image display apparatus to which an oscillating device according to the invention is applied.

FIG. 12 is a schematic view of the projection-type image display apparatus according to the sixth embodiment. Reference numeral 601 denotes a light deflection unit, reference numeral 602 denotes a laser light source serving as a light source, reference numeral 603 denotes a group of lenses, reference numeral 604 denotes a group of writing lenses, and reference numeral 605 denotes a projection surface.

In this embodiment, the light deflection unit 601 includes two optical deflectors. One of the optical deflectors is to scan light in a horizontal scanning direction, and the other is to scan light in a vertical scanning direction. That is, in this embodiment, light can be deflected two-dimensionally (raster-scanned), and a two-dimensional image can be displayed. At least one of the optical deflectors may be the optical deflector that is the oscillating device according to the invention. Specifically, it is preferred that the optical deflector for scanning in the horizontal direction is the optical deflector that is the oscillating device according to the invention. Arranging the apparatus like this can meet the requirement that the optical deflector for horizontal direction scanning performs high speed scanning. In such a case, it is preferable that the optical deflector moves in a resonance manner.

A light emitted by the laser light source 602 contains image information for constituting each pixel for a two-dimensional image. Specifically, the light can be turned on or off or changed in intensity for each pixel independently of the other pixels, for example.

The projection surface 605 is a surface on which an image is projected. It may be provided in the image display apparatus as in this embodiment or separately from the image display apparatus. It may be a screen or the like, an outdoor or indoor wall, or a retina of an animal such as human being.

The group of lenses 603 is provided as needed to condense the light from the laser light source 602 onto the light deflection unit. It may consist of a single lens.

The group of writing lenses 604 is a lens group through which the light reflected by the light deflection unit passes.

It is provided as needed to magnify the image or display the same at a predetermined position and may consist of a single lens.

(Seventh Embodiment)

A seventh embodiment of the invention relates to an electrophotographic image-forming apparatus having the oscillating device according to any of the first to fifth embodiments.

Figure 13:
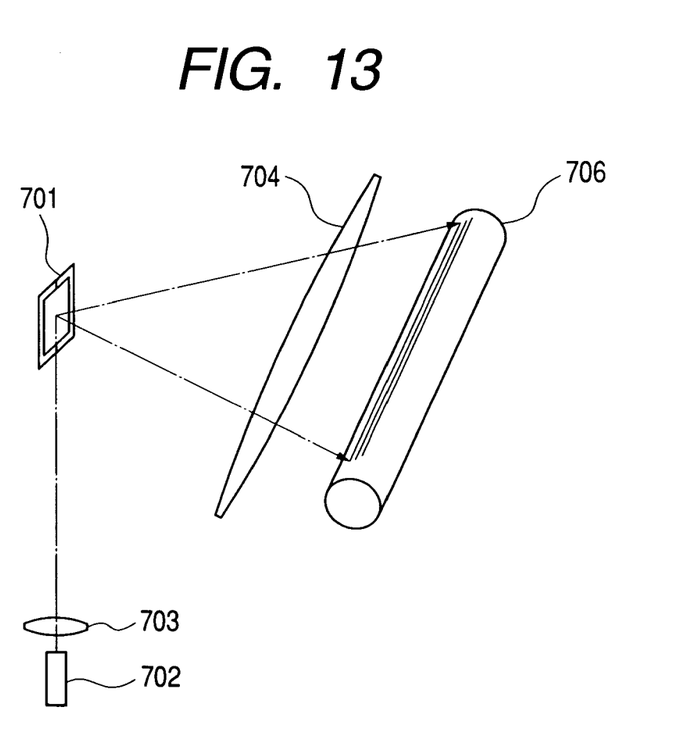
FIG. 13 is a view illustrating an electrophotographic image-forming apparatus to which an oscillating device according to the invention is applied.

FIG. 13 is a schematic view of the projection-type image-forming apparatus according to the seventh embodiment. Reference numeral 701 denotes an optical deflector, reference numeral 702 denotes a laser light source serving as a light source, reference numeral 703 denotes a group of lenses, reference numeral 704 denotes a group of writing lenses, and reference numeral 706 denotes a photosensitive member.

A light emitted by the laser light source 702 passes through the group of lenses 703, is deflection-scanned one-dimensionally by the optical deflector 701, passes through the group of writing lenses 704 and then is applied to the surface of the cylindrical photosensitive member rotating about the longitudinal axis. As a result, a two-dimensional latent image is formed on the surface of the photosensitive member. From the latent image, an image can be formed on an image formation surface by an electrophotographic image formation technique. Products having a function of implementing the technique include a laser beam printer and a copying machine.

The light emitted by the laser light source 702 contains image information for constituting each pixel for the two-dimensional image. Specifically, the light can be turned on or off or changed in intensity for each pixel independently of the other pixels, for example.

The group of lenses 703 is provided as needed to condense the light from the laser light source 702 onto the optical deflector. It may consist of a single lens.

The group of write lenses 704 is a lens group through which the light reflected off the optical deflector passes. It is provided as needed to magnify the image or display the same at a predetermined position and may consist of a single lens.

(Eighth Embodiment)

An eighth embodiment of the invention relates to an apparatus other than the optical deflector and has the oscillating device according to any of the first to fifth embodiments. In the first to fifth embodiments, the mirror serving as a light reflection surface is provided on the movable plate. In these embodiments, a separate component serving as the light reflection surface may be provided on the movable plate, or the surface of the movable plate itself may be processed to be the light reflection surface or used as such, as the light reflection surface.

In this embodiment, taking advantage of oscillation of the movable plate, the oscillating device can be used as an angular displacement sensor or a device for reflecting electromagnetic waves or acoustic waves (not shown).

As described above with reference to the embodiments, the invention can provide a small-size oscillating device.

In addition, the invention can reduce the current supplied to the coil, and thus, the power consumption of the device.

What is claimed is:

1. The oscillating device comprising:
   a movable plate,
   an elastic supporting part connected to the movable plate,
   a substrate connected to the elastic supporting part, and
   a coil,
   wherein the coil is disposed on the substrate, and the movable plate oscillates about the elastic supporting part by the action of a magnetic field generated by the coil and wherein the coil is disposed on each of the front and back surfaces of the substrate.

2. The oscillating device according to claim 1, wherein the coil disposed on the front surface of the substrate and the coil disposed on the back surface of the substrate are electrically separated from each other.

3. The oscillating device according to claim 1, wherein the coil disposed on the front surface of the substrate and the coil disposed on the back surface of the substrate are electrically connected to each other.

* * * * *

UNITED STATES PATENT AND TRADEMARK OFFICE
CERTIFICATE OF CORRECTION

PATENT NO. : 6,989,614 B2  Page 1 of 1
APPLICATION NO. : 10/642598
DATED : January 24, 2006
INVENTOR(S) : Yasushi Mizoguchi et al.

It is certified that error appears in the above-identified patent and that said Letters Patent is hereby corrected as shown below:

COLUMN 4
Line 24, "coil is" should read --coil are--.

COLUMN 5
Line 51, "embodiment" should read --embodiments--.

COLUMN 9
Line 46, "FIGS. 11B" should read --FIGS. 10B--.

Signed and Sealed this

Thirtieth Day of January, 2007

JON W. DUDAS
*Director of the United States Patent and Trademark Office*